(No Model.) 2 Sheets—Sheet 1.
E. J. McCLELLAN.
LATHE.
No. 533,997. Patented Feb. 12, 1895.
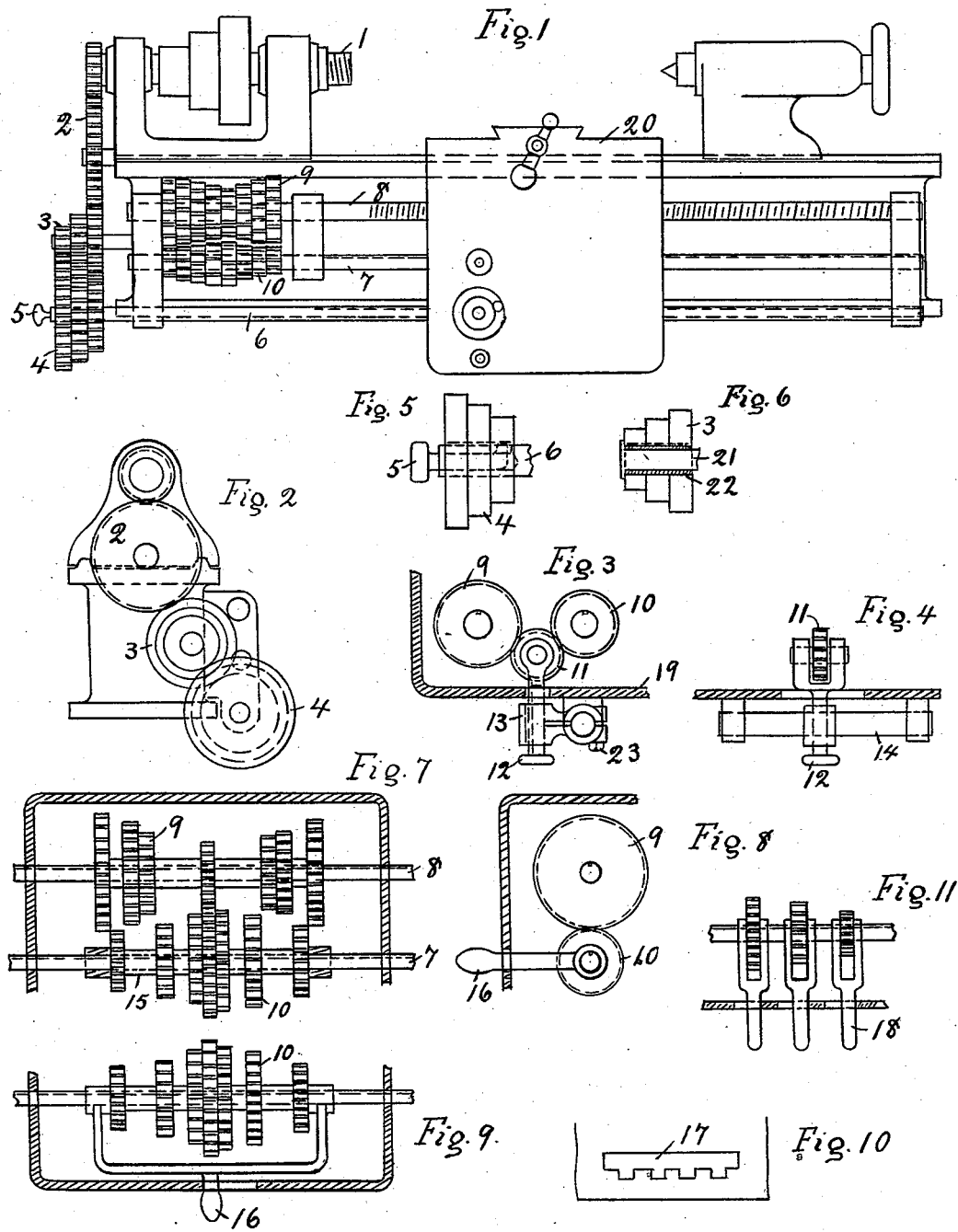
Witnesses.
M. E. Barnett.
C. H. McClellan
Inventor
Edward Joseph McClellan (No Model.)
2 Sheets—Sheet 2.

E. J. McCLELLAN.
LATHE.

No. 533,997. Patented Feb. 12, 1895.

Witnesses.
M. E. Barnett.
C. A. McClellan

Inventor
Edward Joseph McClellan

UNITED STATES PATENT OFFICE.

EDWARD JOSEPH McCLELLAN, OF NEW YORK, N. Y.

LATHE.

SPECIFICATION forming part of Letters Patent No. 533,997, dated February 12, 1895.

Application filed July 27, 1894. Serial No. 518,752. (No model.)

*To all whom it may concern:*

Be it known that I, EDWARD JOSEPH MC-CLELLAN, a citizen of the United States, residing at New York, in the county of New York and State of New York, have invented an Improvement in Lathes, of which the following is a specification, reference being had to the accompanying drawings.

The lathe here shown is an improvement on the lathe with differential screw and nut, for which I was granted Patent No. 502,131, dated July 25, 1893, which shows the principle as applied to a milling machine and a lathe and in which the theory is explained at length.

The main idea of this lathe is the use of a differential screw and nut for all purposes, dispensing with rack feed altogether.

Figure 12:
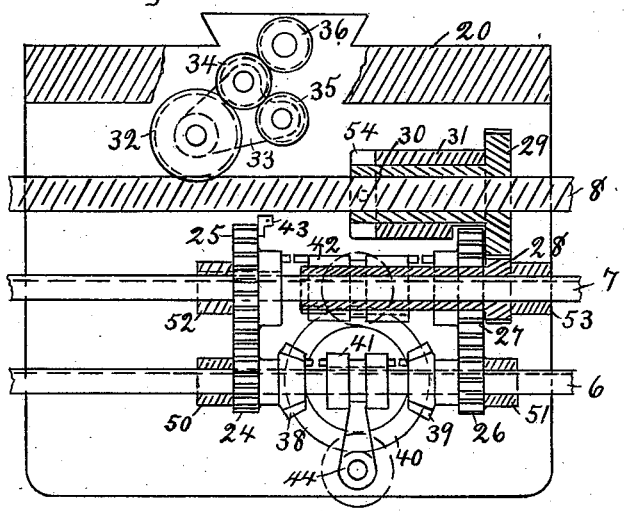
Figure 13:
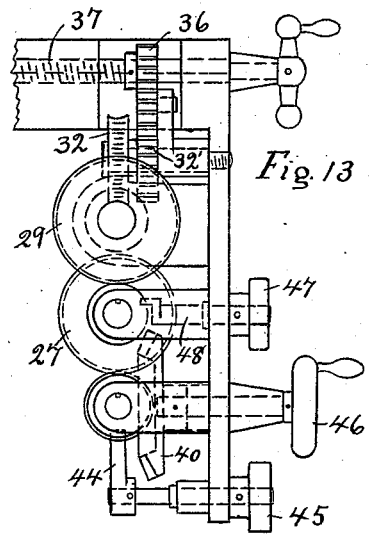
Figure 14:
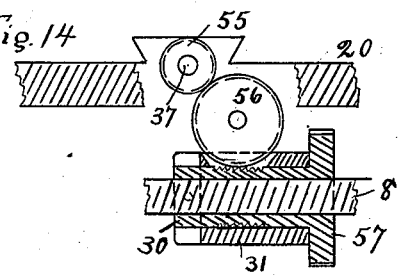
Figures 15, 16:
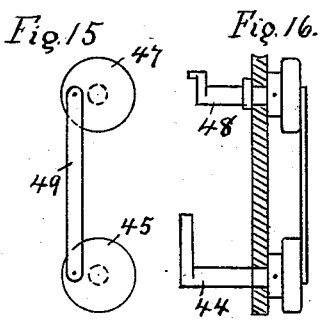
Figure 17:
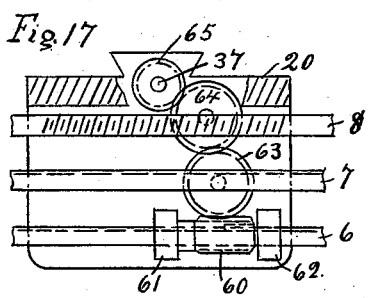
Figure 18:
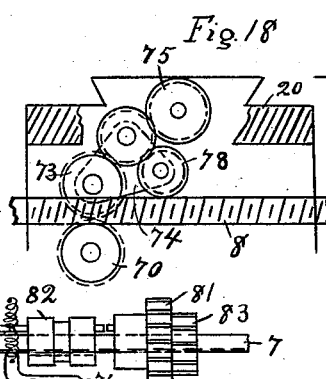
Figure 19:
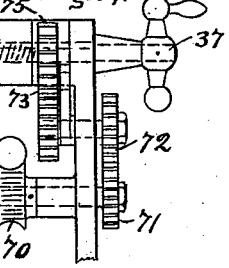
Figure 20:
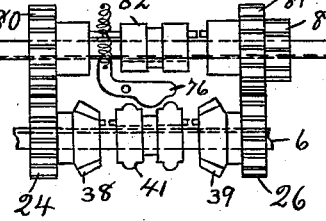

Figure 1 is a side view of the lathe. Fig. 2 is an end view of the head stock showing the arrangement of gearing from spindle 1 to shaft 6. Figs. 3 and 4 are end and plan views of the change gears at the head-stock end of the feed screw 8 and feed shaft 7, when used with a sliding intermediate pinion 11 to connect from the feed shaft 7 to the feed screw 8. Figs. 5 and 6 are views of the gears 4 and 3 respectively, on head-stock end of bed. Figs. 7 and 8 are front and end views of the change gears on the head-stock end of the feed screw 8 and feed shaft 7, as used without an intermediate pinion, the gears being pushed sidewise to bring the different pairs successively into mesh. Fig. 9 is a plan view showing yoke 16 for sliding gears 10 along the shaft 7. Fig. 10 is a view of notches for locking handle 16 in position. Fig 11 is a modification showing a method of moving the gears 10 individually by means of separate independent handles 18. Referring to Sheet 2, Fig. 12 is a view of the apron of the carriage looking from the inside. Fig. 13 is an end view of the carriage. Fig. 14 shows a modification in which the cross feed screw 37 is driven from the feed nut 30. Figs. 15 and 16 are front and side views of plan for connecting the knobs 45—47, on the carriage, so as to act together in throwing the clutches to which they are attached. Fig. 17 is a modification showing means of driving the cross feed screw 37 from the lower shaft 6. Figs. 18 and 19 are front and end views of gearing for connecting from the feed screw 8 to the cross feed 37 with means of making changes by means of the outside gears 71—72. Fig. 20 shows a latch 76 for locking the shaft 7, and consequently the screw 8, from turning when the power feed is thrown out and it is desired to feed the carriage by rotating the nut 30 without having to rotate the lead screw.

Connecting from the end of the spindle 1 is a train of gears 2 which drives a cone of gears 3, which are all keyed on one common bushing 22 and run loose on a stud 21 as shown in detail in Fig. 6. Meshing with the gears 3 is a corresponding cone of gears 4 mounted loose on the shaft 6 and individually independent and which drives the shaft 6 by means of a sliding key 5, as shown in detail in Fig. 5. The shaft 6 is cut open on one side and in the cut moves the sliding key 5 which is moved by means of the knob shown, and according as the key 5 is brought into relation with any particular gear, that gear and its corresponding one in the set 3 will control the speed of the shaft 6.

Mounted loose on the shaft 6, see Fig. 12, and carried along by the apron of the carriage 20, are the two bevel gears 38—39 which mesh with the large bevel gear 40 carried on the apron. The bevel gears 38—39 are confined by the lugs 50—51 of the apron in which the shaft 6 runs, and are thus carried along with the apron.

Between the bevel gears 38—39 is the clutch 41 which is keyed on the shaft 6 and this clutch drives the bevel gears 38—39 according to its position, by means of the clutch pins on the gears 38—39. Fast on the hubs of the bevel gears 38—39 are the gears 24—26 respectively, which drive the gears 25—27. The gear 25 is keyed on the shaft 7 and the gear 27 is loose on the long sleeve of the gear 28 which latter is loose on the shaft 7. These gears 25—28 are confined by the lugs 52—53 on the apron, in which the shaft 7 runs, in the same manner as the bevel gears 38—39 and carried along by the apron in the same way. The gear 25 is prevented from moving away from the lug 52 alongside, by means of a small projecting piece 43, on which the apron as shown, and the gear 27 is confined by the notch in the lug 31. Between the gears 25—27 is the clutch 42 which is keyed on the sleeve of the gear 28 and through which the gears 25—27 drive the nut 30, according as the clutch 42 is engaged with one or the other of the clutches on the gears 25—27. These clutches 41—42 have a groove turned on the outside as shown, and engaging in this groove in clutch 42 is a crank pin carried on the inner end of the shaft 48 and the clutch 41 is moved by an arm 44. By this means the clutches are carried along with the apron as well as thrown from one gear to the other. The shaft 48 is turned by the knob 47 and the arm 44 is moved by the knob 45. Loose on the shaft 7 is the gear 28 which drives the gear 29 which is solid on the rotary nut 30. This nut 30 is carried in a lug 31 on the inside of the apron, and is prevented from moving endwise in its seat by means of the gear 29 on one side and the collar 54 on the other. Through this nut passes the lead screw 8 and through the medium of the nut 30 the carriage 20 is fed along.

Keyed on the head-stock end of the shaft 7 is the set of change gears 10 which drives the corresponding gears 9 which are keyed on the end of the feed screw 8. To connect any corresponding pair of gears of the sets 9 and 10 I have a sliding intermediate pinion 11, as shown in Figs. 3 and 4, or one set of gears may be moved sidewise until corresponding pairs come in line which is the arrangement shown in Figs. 7, 8 and 9. Taking up the plan of the adjustable sliding pinion, I have a gear 11 held on a rod 12 which is splined and adjustable in and out in a holder 13. This holder 13 is itself adjustable along a bar 14, which runs along the front of the casing 19 of the gears, and also swivels on this bar so as to permit the gear 11 to adjust itself to the gears. The holder 13 is bound on the bar 14 by a bolt 23 and the saw cut for this bind is continued up into the hole for the rod 12 and the effect of this is that with a light casting, the hole for the rod 12 is sprung and binds on the rod 12 when the holder is clamped on the bar 14 and thus one binding does for both.

With the plan of sliding the gears it will be seen that they are set at various distances apart by means of distance collars 15. As shown in Figs. 7 and 8 the lower set of gears 10 are slid bodily along the shaft 7 while the upper set 9 is fixed. These gears are all keyed on their respective shafts. The middle pair is shown in gear and as the gears are moved along to the right or left, the ones on the extreme ends come next in line while the middle ones are then out of mesh and by continued motion to the right or left the other pairs on either side come successively in line. It will be observed that no sliding key is used at all. To effect this sliding of the gears, the gears 10 are embraced by a yoke 16, as shown in Figs. 8 and 9, which fits on the shaft 7 and the handle of which projects through the casing of the gears and is used to move the gears.

To hold the gears in any particular position corresponding to certain gears, the slot in the casing is provided with notches 17, as shown in Fig. 10, and the shank of the handle 16 drops into notches and prevents the yoke and gears from moving sidewise.

Instead of sliding the whole set of gears at once I may slide the gears individually by means of a separate yoke 18 to each gear, as shown in Fig. 11.

It is obvious that I might use a sliding key for the gears 9—10 in the same manner as shown for gears 4.

To drive the cross feed a worm gear 32, see Fig. 12, is mounted on the lead screw 8. Fast with the worm gear 32 is a spur gear 32' of the same size and connecting with this is the gear 34 which is connected with the gear 35, these two gears being mounted on a plate 33 which swings on the same center as the gear 32. Fast on the cross feed screw 37 is the gear 36 and by means of the swing plate 33 either of the gears 34—35 are brought into connection with the gear 36. The plate 33 may be swung into a central position in which neither of the gears 34—35 is connected to gear 36 and by changing from gear 34 to gear 35 the motion of the cross feed screw 37 is reversed.

Instead of mounting a worm gear on the screw 8 I may cut a worm on the outside of the rotary nut 30, as shown in Fig. 14, and mount a worm gear 56 on this and connect up to the gear 55 on the cross feed screw. Another plan for driving the cross feed is indicated in Fig. 17. Mounted on the lower feed shaft 6 is a worm 60 which is keyed on the shaft and carried along with the apron by means of the lugs 61—62 between which it is confined. The gear 65, which is fast on the cross feed screw, is connected with the worm 60 by means of the gears 63—64 as indicated.

To provide an extra number of changes of cross feed a plan shown in Figs. 18 and 19 is used. A worm gear 70 is mounted on the lead screw 8 and on the outer end of the shaft on which the worm gear 70 is fastened, is the gear 71 which connects with the gear 72. On the inner end of the shaft on which the gear 72 is mounted, is the gear 73 which connects to the gear 75 on the cross feed screw 37 by means of a swing plate and two intermediate gears in the same manner as is Fig. 12. The gears 71—72 may be readily removed and changed and thus provide the means of making changes.

It is obvious that the rotation of the bevel gears 38—39 on the apron will be changed according as the driving clutch 41 is engaged with one or the other, and consequently they provide the means for reversing the feed of the carriage since the feed gears are driven from these bevel gears.

The upper clutch 42 is to provide means for making the nut 30 rotate in the same or opposite direction to that of screw 8. Supposing the clutch 41 engaged with the gear 39 and the clutch 42 engaged with the gear 25 and the gears 9—10 connected by means of an intermediate gear, it will be seen that the nut 30 and the screw 8 will rotate in opposite directions and if the clutch 42 be thrown over to the gear 27 while the clutch 41 remains with the gear 39, the screw and nut will rotate in the same direction. If the clutch 41 only, be thrown over, the relative rotations of the screw and nut remain the same but both are reversed as previously explained. When the gears 9—10 are made to mesh directly without any intermediate pinion the action is the same as with the pinion, except that the clutch 42 must be thrown to the opposite side from that of the clutch 41 to have the screw 8 and nut 30 rotate in the same direction. This will be clear on tracing out the motion. When using the power cross feed for facing off, it is obvious that the carriage 20 must stand still on the ways, and to accomplish this when the cross feed is being driven from the screw 8 or the rotary nut 30, the screw 8 and the nut 30 must rotate at the same rate and in the same direction. This is effected by having one of the pairs of gears 9—10 of the same ratio as the gears 28—29 on the apron. If this particular pair of gears of the sets 9—10 is not thrown in but some other pairs, the carriage will feed along at the same time that the tool is feeding across and thus I have provision for turning tapers and as all feeds are by screw, these tapers will be accurate.

The gears 3—4 are made with the same hole and key way so that they may exchange places. By having the hand wheel 46 on the same shaft with the bevel gear 40 on the apron, I provide for hand feed, the clutch 41 then being in the middle position.

For quick working and to save extra motions it may be desirable to be able to throw out the clutches 41—42 simultaneously and for this purpose the knobs 45—47 may be connnected by a link 49 as shown in Figs. 15 and 16 or the knobs might be geared together, or other well known means employed for the purpose. It is obvious that this connection may be employed to throw the clutches in opposite directions and to throw in one clutch when the other is thrown out. When it is objectionable to turn the lead screw by hand for hand feed I may automatically lock the lead screw from turning when the power feed is thrown out, and simply rotate the nut 30 by hand. This is shown in Fig. 20, and here the clutch 41 between the bevel gears 38—39 has ridges at each end. Bearing on the clutch 41 is a latch 76 which is pivoted on the apron and held by a spring so that one end is pressed on the clutch 41 and the other end up against the shaft 7 so as to enter the key way and lock the shaft 7. When this device is used the gears 80—81 are loose on the shaft 7 and the clutch 82 is mounted direct and keyed on the shaft 7. The gear 83 is fast with the gear 81 and drives the gear 29 on the rotary nut 30, not shown. With this plan the power rotation of the nut is not reversed but that of the screw 8 is, which is the opposite of the plan shown in Fig. 12. When the clutch 41 is in the middle position the power connection is thrown out and the end of the latch 76 sinks into the space between the ridges on the clutch 41, while the other end of the latch is pressed into the keyway in the shaft 7 and prevents it, and consequently the screw 8, to which it is connected by the gears 9—10, from turning. The nut 30 is of course perfectly free to be turned by the connection to the bevel gear 39. When the clutch 41 is moved to the right or left to throw in the power connection, the lower end of the catch rides up on the ridges of the clutch 41 and the upper end of the catch is thereby tipped out of the keyway in shaft 7 leaving the shaft free to turn.

It will be seen that the clutches are made with but one tooth which is desirable for running back faster, or by hand, when screw cutting, as explained farther on.

The action is as follows: Supposing the lathe started and the sliding key 5 in the outer pair of the gears 3—4, the feed rod 6 will be rotated at the lowest rate and the clutch 41 being thrown to the right or left, the gears 38—39 and 24—26 will be rotated and from these the gears 25—27. From the gear 28 driven from gear 25 or 27, the nut 30 will be driven by means of the gear 29. If now the clutch 42 be thrown to the same side as that of the clutch 41, the nut 30 will rotate in the same direction as the screw 8, as previously explained, and vice versa, supposing an intermediate pinion is used with the gears 9—10. When the gears 9—10 are used without the intermediate pinion, the relative positions of the clutches 41—42 are changed, to give the same effect as before, as previously mentioned. By means of the changes available by the gears 9—10 I can vary the relative rotative speeds of the screw and nut and thus get different rates of feed or pitch as discussed at length in my previous patent before mentioned. By making the screw and nut rotate in opposite directions it will be clear on a little consideration that the carriage will be fed along at a faster rate than that due to the revolution of the screw alone. When the screw and nut rotate in the same direction, the screw loses, since if the nut rotated at the same rate as the screw, the carriage would not advance at all. There are thus two extremes of feed available with every change of the gears 9—10. As shown, the nut 30 rotates at a constant rate relative to the feed shaft 6 and the changes of feed are obtained by varying the speed of the feed screw 8 by the gears 9—10.

Supposing the cross feed screw 37 connected to the nut 30, it will be driven at one constant rate while the feed screw 8 will feed the carriage along at various rates, relatively to the cross feed by means of the changes provided by the gears 9—10. When the carriage is fed along fast, relatively to the cross feed, I get a slow taper and when the longitudinal feed is about the same as the cross feed, I get a taper approaching forty-five degrees. It will be seen that there are two tapers available for every change of the gears 9—10, as a different taper is produced with every relative change of the longitudinal feed. When the screw and nut rotate in the same direction and at the same rate, the carriage does not move longitudinally at all, and connecting the cross feed screw 37 simply gives cross feed. The changes provided by the gears 3—4 simply multiply the pitches obtained by the gears 9—10 relatively to the spindle. The gears 9—10 give the changes for screw cutting and also the changes for tapers and thus serve two functions.

In practical working, in turning some very straight tapers, it will be necessary to compound the train of gears 2 after the usual manner in screw cutting lathes in order to obtain a sufficiently fine feed relatively to the spindle.

When the clutch 41 is in the middle position and the clutch 42 engaged on either side, the screw and nut may be rotated by hand by means of the hand wheel 46, and all the changes of the gears 9—10 are available for the hand feed. As the bevel gear 40 is larger than the pinions 38—39, the hand wheel 46 will not rotate as fast as the shaft 6 and never so fast as to be at all objectionable.

With this lathe I dispense with rack feed altogether. All feeds are positive, and the control of the various motions is located on the carriage. Changes for screw cutting turning feeds, (which are simply fine threads) and tapers, are made with the same set of gears and without any handling whatever. The taper turning is not limited to any particular part of the bed.

When the clutches 41—42 are made with but one tooth each, as shown in Fig. 12 Sheet 2, and the bevel gears 38—39, with but one clutch tooth also, and the changes of the gears 3—4, even ratios, as shown, of one to one, one to two, and one to four, the clutch 41 may be thrown out and the carriage run back by hand when screw cutting, without reversing the lathe. Take the simplest case, in which the shaft 6 rotates at the same rate as the spindle, and supposing the carriage run back to a certain point on the bed from which it started. The pin on the clutch 41 corresponds with the point on the spindle at which the cut started, and the clutch pin on the gear 38 for instance corresponds to the position of the carriage, and if the clutch be thrown too late to engage at once, it indicates that the point on the spindle corresponding to the position of the carriage had gone by.

The special features of this lathe apply equally well to monitor lathes or screw machines and to any other form of lathe.

What I claim is—

1. The combination in a lathe, of a carriage, a differentially rotating screw and nut to feed said carriage longitudinally, and a cross feed screw carried on said carriage and geared to said differential screw and nut so as to vary the amount of cross feed according to the different numbers of revolutions of said differential screw and nut per unit of longitudinal feed, for cross feed and taper turning, substantially as described.

2. The combination of a lathe having a differential screw and nut to feed the carriage of said lathe, of a cross feed screw geared to said screw and nut, and but one set of change gears for both varying the relative rates of the longitudinal and cross feeds for taper turning, and giving the changes for screw cutting and turning, substantially as described, 3. The combination in a lathe having a differential screw and nut to feed the carriage of said lathe, of a cross feed screw geared to said screw and nut, and change gears carried on the carriage, for varying the ratio of said geared connection between the differential screw and nut and the cross feed screw, substantially as described.

4. A catch 76 operated by the action of the clutch 41, to lock the feed screw from turning, substantially as described.

5. The combination in a lathe, of a carriage, a differentially rotating screw and nut to feed said carriage, reversing one tooth clutches for power connection to said differential screw and nut, and one tooth reversing clutches between gearing connecting said differential screw and nut together, for the purposes and substantially as described.

6. The combination in a lathe having a differential screw and nut to feed the carriage of said lathe, of a feed shaft 6 to connect the driving gears at the headstock end of the bed with the feed shaft 7 and feed screw 8, carrying the change gears, and with rotary nut 30, through the medium of gears and clutches carried on the carriage, substantially as described.

7. The combination in a lathe having a differential screw and nut to feed the carriage of said lathe, of reversing gears with intermediate clutch to reverse the power connection to said carriage, and a second set of gears connecting with the first set, also with intermediate clutch, to reverse the relative rotations of said screw and nut, substantially as described.

8. The combination in a lathe having a differential screw and nut to feed the carriage of said lathe, of a clutch to reverse the power connection to said carriage and a second clutch connected to the first, for reversing the relative rotations of said differential screw and nut, each clutch mutually controlling the motion of the other, substantially as described.

9. The combination in a lathe, of change gears 3—4 with sliding key, splined shaft 6, clutch 41, gears 38, 39, 40, handwheel 46, gears 24—25, 26, 27, clutch 42, gears 28—29, rotary nut 30, cross feed screw 37, gears 32—36, carriage 20, splined shaft 7, feed screw 8 and change gears 9—10, substantially as described.

EDWARD JOSEPH McCLELLAN.

Witnesses:
C. H. McCLELLAN,
M. E. BARNETT.